(12) United States Patent
Somaiah et al.

(10) Patent No.: US 10,768,878 B2
(45) Date of Patent: Sep. 8, 2020

(54) ACCESSING A SERVICE, SUCH AS A PRINTING SERVICE, VIA A SCANNABLE CODE

(71) Applicant: Dell Products L. P., Round Rock, TX (US)

(72) Inventors: Chetan P. Somaiah, Bengaluru (IN); Arockiaraj Durairaj, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/965,100

(22) Filed: Apr. 27, 2018

(65) Prior Publication Data
US 2019/0332340 A1 Oct. 31, 2019

(51) Int. Cl.
*H04N 1/00* (2006.01)
*G06F 3/12* (2006.01)
*G06K 7/14* (2006.01)
*G06Q 20/36* (2012.01)
*H04W 12/06* (2009.01)

(52) U.S. Cl.
CPC .......... *G06F 3/1292* (2013.01); *G06F 3/1204* (2013.01); *G06F 3/1222* (2013.01); *G06F 3/1238* (2013.01); *G06F 3/1259* (2013.01); *G06F 3/1297* (2013.01); *G06K 7/1417* (2013.01); *G06Q 20/36* (2013.01); *H04W 12/06* (2013.01)

(58) Field of Classification Search
CPC .... G06F 3/1292; G06F 3/1238; G06F 3/1239; H04N 1/34; H04N 1/344; H04N 1/346
See application file for complete search history.

(56) References Cited

U.S. PATENT DOCUMENTS

| 2003/0227640 | A1* | 12/2003 | Liang | G06F 3/1206 358/1.13 |
|---|---|---|---|---|
| 2006/0041538 | A1* | 2/2006 | King | H04N 1/00244 |
| 2009/0303525 | A1* | 12/2009 | Yoshida | G03G 21/02 358/1.15 |
| 2011/0085196 | A1* | 4/2011 | Liu | G06F 3/1204 358/1.15 |
| 2014/0070002 | A1* | 3/2014 | Pineau | G06K 5/00 235/382 |
| 2014/0368863 | A1* | 12/2014 | Suzuki | H04N 1/00899 358/1.14 |

(Continued)

*Primary Examiner* — Eric A. Rust
(74) *Attorney, Agent, or Firm* — Campbell Stephenson LLP; Shiv S. Naimpally (57) ABSTRACT

A method includes receiving from a server, by one or more processors, account information associated with a device. The account information specifies an identifier and an amount of credit in an account associated with the device, where the identifier uniquely identifies the device. The method also includes initiating a wireless connection with the device, and authenticating the device based at least in part on the identifier. The method includes receiving a document to print, printing the document, and modifying the amount of credit in the account to create an updated credit amount. The method also includes receiving an additional document for printing, translating the additional document to a format that the printer is capable of printing. The method includes printing the additional document and modifying the updated credit amount. In the method, the device lacks a printer driver associated with the printer.

17 Claims, 5 Drawing Sheets

(56) References Cited

U.S. PATENT DOCUMENTS

2015/0234623 A1* 8/2015 Mochizuki ............ G06F 3/1238
358/1.14
2015/0339561 A1* 11/2015 Takenaka ................ B41J 29/00
358/1.14
2016/0034237 A1* 2/2016 Kojima ................ G06F 3/1205
358/1.15
2017/0061383 A1* 3/2017 Miyauchi ........... G06Q 10/1057

* cited by examiner

ACCESSING A SERVICE, SUCH AS A PRINTING SERVICE, VIA A SCANNABLE CODE

BACKGROUND OF THE INVENTION

Field of the Invention

This invention relates generally to computing devices and, more particularly to enabling access to a service, such as a printing service, via a scannable code, such as, for example, a quick response (QR) code.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As we move closer to the internet of things, the ability to seamlessly yet securely connect to a servicing device may be beneficial. Many people use their smartphone or tablet as their primary computing device. However, unlike a desktop computing device, smartphones and tablets are usually not hardwired to peripherals, such as a printer. This makes it difficult to print documents etc. from a smartphone or a tablet.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may scan a machine-readable label associated with a printer. In response to scanning the machine-readable label, the computing device transmits a print request (e.g., to a server) specifying payment information, an identifier of the device, and an identifier of the printer. Further, the computing device lacks a device driver associated with the printer. A service device, such as the printer, may receive from the server, account information associated with the user device. The account information specifies the device identifier, and an amount of credit in an account associated with the device. The service device searches for the user device and establishes a wireless communication with the user device. The service device authenticates the user device (e.g., based at least in part on the device identifier) and receives digital data (e.g., documents to print) from the user device through the wireless communication. The service device processes the digital data (e.g., prints the documents) and modifies the amount of credit in an account to create an updated credit amount.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

A paid service may be provided by a service device, where the paid service is accessed through a smartphone. The service device provides a service or product that is available for purchase, where the service device is capable of connecting to a smart phone by way of a wireless connection. Examples of a service device may include a printer, a vending machine, a coffee machine, a kiosk responsible for managing bikes in a bike share program, etc. The service device may be configured to work within a shared network including other devices (e.g., other service devices, computing devices, etc.), where the service device and other devices may communicate with each other through the shared network. The smart phone may access services provided by the service device without accessing the shared network connection.

For example, a printer may be configured to work within a network including other devices. If a user wishes to print documents using her device, aside from ensuring her device is connected to the same network as the printer, the device may also need a driver that is specific to the printer. The manufacturer for the printer may provide the driver to be installed on the user's device. In this setup, devices that are not part of the same network as the printer, cannot access the printer. The printer may be accessed in other ways, however. For example, a user may connect a storage device directly to the printer (e.g., pen drive).

As discussed herein, another way to connect to a printer may include a user, using her user device, scanning a QR code displayed on a service device such as a printer. After scanning the QR code, the user device transmits account information (e.g., device identifier) associated with the user device to a service vendor. The account information may also include payment information to pay for a service (e.g., printing documents) provided by the service device (e.g., printer). The payment information may include credit card information or an amount of credit in a digital wallet, where the credit card or digital wallet is charged or debited for the number of pages that are printed. The service vendor communicates with the printer and transmits account information (e.g. the device identifier and amount of credit in an account) to the printer. The user device enables a wireless connection on the device (e.g., Bluetooth®).

After receiving the account information, the printer may establish a wireless connection (e.g., Bluetooth® connection) with the user device. The wireless connection between the user device and the service device may be different from an area network that connects the service device to other devices in an environment (e.g., the wireless connection is different from a wide area network or local area network connecting multiple office printers). The user device may transfer digital data (e.g., documents to be printed) to the service device (e.g., printer) through the wireless connection. Additionally, the user device is able to print documents on the printer without downloading or maintaining a driver for the printer on the user device. The service device (e.g., printer) may modify the amount of credit (e.g., debit a digital wallet or charge a credit card) in an account to create an updated credit amount.

In an example where the service device is a printer, the user device may transfer documents to the printer for printing but have insufficient credit in an account. The printer may send a notification indicating insufficient funds to the user device. Alternatively, the user device may receive a notification indicating insufficient funds from the service vendor. A user may add credit to the account, and transmit that information to the service vendor. The service vendor may sent the updated information about the credit in the account to the printer. After confirming sufficient funds are in the account, the printer may print the documents.

As a first example, a computing device (e.g., with the functionality of a smart phone) may include one or more processors and one or more non-transitory computer-readable media storing instructions executable by the one or more processors to perform various operations. For example, the computing device may scan a machine-readable label associated with a printer. In response to scanning the machine-readable label, the computing device may transmit a print request to a server. The print request may specify payment information, an identifier of the device, and an identifier of the printer. Further the computing device lacks a device driver associated with the printer.

The computing device initiates a wireless connection to the printer (e.g. Bluetooth® connection) and receives confirmation that the wireless connection to the printer is established. The wireless connection may be a connection different from an area wide network, or a local area network that may connect the printer to other printers and computing devices in an office. The computing device transmits the identifier of the device to the printer and receives confirmation that the computing device has been authenticated. The computing device transmits, by the wireless connection, a document to the printer.

In a second example, a service device (e.g., a printer or any wireless enabled device) may include one or more processors and one or more non-transitory computer-readable media storing instructions executable by the one or more processors to perform various operations. For example, the service device may receive from a server, account information associated with a user device (e.g., through a print request). The account information may specify a device identifier that uniquely identifies the user device and an amount of credit in an account associated with the user device.

The user device may initiate a search for a wireless communication with the service device. In turn the service device may also initiate and search for the user device and establish a wireless communication with the user device. The service device may authenticate the user device (e.g., based at least in part on the device identifier) and receive digital data from the user device. The service device may receive the digital data through the wireless communication, and in one example, the digital data may represent documents to be printed. The service device processes the digital data (e.g., prints the documents) and modifies the amount of credit in an account to create an updated credit amount.

In a third example, a service device (e.g., a wireless enabled vending machine) may include one or more processors and one or more non-transitory computer-readable media storing instructions executable by the one or more processors to perform various operations. For example, the service device may receive from a server, account information associated with a user device (e.g., a smart phone stores account information of a user, the vending machine receives that account information from the server). The account information may specify a device identifier that uniquely identifies the user device and an amount of credit in an account associated with the user device.

The user device may initiate a search for a wireless communication with the service device. In turn the service device may also initiate and search for the user device and establish a wireless communication with the user device (e.g., the smart phone and vending machine are connected through the wireless communication). The service device may authenticate the user device (e.g., based at least in part on the device identifier) and receive digital data from the user device. The service device may receive the digital data through the wireless communication, and in one example, the digital data may represent data specifying an item in the vending machine. The service device processes the digital data (e.g., dispenses the requested item) and modifies the amount of credit in an account to create an updated credit amount.

Figure 1:
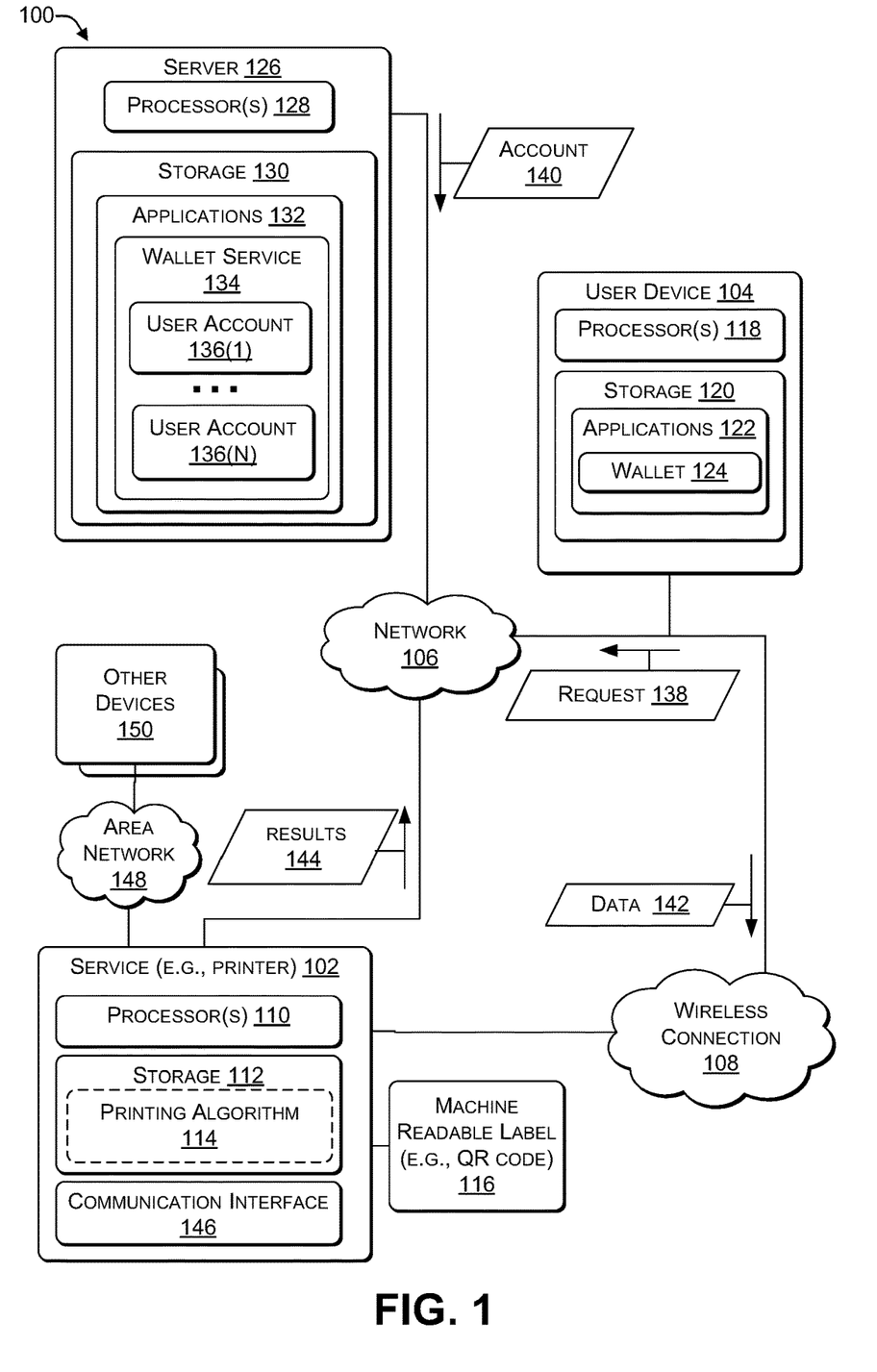
FIG. 1 is a block diagram of a network architecture to access a device through a wireless communication according to some embodiments.

FIG. 1 is a block diagram illustrating part of a network architecture 100 that includes a service (e.g., printer) 102, a user device 104, and a server 126. Service 102 represents a hardware device capable of providing products or a service that is available for purchase. For example, service 102 may include a printer, a vending machine, a coffee machine, a kiosk responsible for managing bikes in a bike share program, etc. In the example where service 102 is a printer, service 102 represents a hardware device capable of printing documents (e.g., tone-based printer, liquid inkjet printer, solid ink printer, dye-sublimation printer, thermal printer, etc.). Service 102 may be a peripheral device that is connected to a computing device or part of an area network 148 (e.g., local area network (LAN), wide area network (WAN), etc.).

Area network 148 may include local area network (LAN) and wide area networks (WAN). The area network 148 may include wired technologies (e.g., Ethernet® and wireless technologies (e.g. WiFI®, code division multiple access (CDMA), global system for mobile (GSM), universal mobile telephone service (UMTS), Bluetooth®, ZigBee®, etc.). For example, service 102 may use a wired connection to connect to other devices 150 over area network 148, service 102 may also use a wireless technology (e.g., WIFI®, CDMA, GSM, etc.) to connect to other devices 150 over area network 148. Thus, as part of an area network 148, the service 102 may be configured to work with other devices 150 (e.g., other service devices and computing devices) that are connected to the area network 148. In the example where service 102 is a printer, service 102 may be located in an office setting. Aside from an office setting, service 102 may also be located in a public location. For example, service 102 may be located in a mall, at a copier store, at a kiosk in a public place, etc.

Service 102 may include one or more processors 110 that execute one or more machine executable instructions. Service 102 may also include storage 112 that may store machine-readable instructions (e.g., programs, algorithms) that may be executed by the one or more processor(s) 110. More specifically, in the example where service 102 is a printer, storage 112 may store a printing algorithm 114 that is capable of receiving documents in various formats (e.g., .doc, .pdf, .jpg, etc.) and translating the documents to a language that may be used by printer 102 to print the documents (e.g., PostScript). For example, printing algorithm 114 may represent a type of driver for the printer.

Service 102 may include communication interface 146. Communication interface 146 may enable service 102 to connect to other devices through a wireless connection 108. Wireless connection 108 may have a range that enables a user device, such as user device 104, to connect to service 102, from around 100 meters away or less. Communication interface 146 may support various wireless protocols. For example communication interface 146 may support protocols such as, 801.11, Bluetooth®, Wireless USB, ZigBee, cellular, satellite, etc. In some examples, wireless connection 108 may represents a Bluetooth®, peer-to-peer, or 801.11 wireless connection. In some examples where service 102 is connected to other devices 150 (e.g., other service devices and computing devices) through an area network 148, the wireless connection 108 is different from the area network 148. As illustrated in FIG. 1, service 102 may connect to user device 104 through wireless connection 108.

Service 102 may display a machine-readable label 116. Machine-readable label 116 include a machine-readable label that contains information about an item to which the label is attached. The machine-readable label 116 may be in a format including a two-dimensional barcode. The machine-readable label 116 may be a Quick Response Code (QR code). In one example, a user device 104 may use an embedded camera to scan the label and use an application to extract the information contained in machine-readable label 116.

In some examples, the machine-readable label 116, may be a paper label affixed to or disposed upon the surface of service 102. In other examples, the machine-readable label 116 may be affixed to or disposed upon a table or wall near printer 102. For example, machine-readable label 116 may be a sticker or a piece of paper taped on printer 102 or on a wall next to printer 102. In other examples, the machine-readable label 116 may be displayed in a digital format on or near printer 102. For example, machine-readable label 116 may be displayed on a display screen of printer 102.

User device 104 includes one or more processors 118 (e.g., CPU, GPU, etc.) and storage 120. User device 104 also includes the capability to connect to wireless connection 108. Accordingly, user device 104 includes a communication interface that supports the protocols of wireless connection 108. For example, user device 104 may include a smart phone, a laptop, a smart watch, a tablet, etc. that is Bluetooth® enabled. In some examples, user device 104, lacks a driver that is specific to printer 102.

Storage 120 in user device 104 may store instructions that can be executed by the one or more processor(s) 118 to perform various functions described herein. For example, storage 120 stores various application 122 that may be executed by the one or more processor(s) 118. One example of an application is wallet 124. Wallet 124 may be an application that includes a digital wallet that enables a user to make electronic transactions. Accordingly, wallet 124 may include account information associated with a user of the user device 104.

Further, account information may include information such an identifier of user device 104, an identifier associated with the account, and an amount of credit in the account. An identifier of the user device uniquely identifies the device and may be alphanumeric. One example of an identifier of the user device 104 is an International Mobile Equipment Identify (IMEI) number. Other examples of an identifier of the user device 104 may include a media access control (MAC) address, a federal communications commission identification (FCC ID) number, an integrated circuit (IC) number, etc.

An identifier of the account uniquely identifies the account and also may be alphanumeric. In some examples, a server of a service vendor may identify an account by way of the identifier of the account. An amount of credit in the account may include a source of payment, a form of payment, or an amount of currency (in digital, or paper format) that may be used toward a transaction. For example, an amount of credit in the account may include an amount of currency (i.e., Ether®, dollar) or a number representing an amount of currency. An amount of credit may also include a source of payment including a payment method (i.e., credit card), a bank account, or any other source of payment that may be used toward a transaction.

The wallet 124 application may interface with a server associated with a service vendor. Accordingly, the user device 104 may communicate with a server of the service vendor by way of wallet 124. Wallet 124 may track an amount of credit available for electronic transactions. In some examples, wallet 124 may also store information such as credit card information, where the credit card is charged after an electronic transaction is completed. Wallet 124 may also store a user's individual bank account, where the account is debited after an electronic transaction is completed.

Aside from connecting to wireless connection 108, user device 104 may also be connected to network 106. Network 106 may include local area network (LAN) and wide area networks (WAN). The network 106 may include wired technologies (e.g., Ethernet® and wireless technologies (e.g. WiFI®, code division multiple access (CDMA), global system for mobile (GSM), universal mobile telephone service (UMTS), Bluetooth®, ZigBee®, etc.). For example, service 102 may use a wired connection to connect to server 126 over network 106, while user device 104 may use a wireless technology (e.g., WIFI®, CDMA, GSM, etc.) to connect to server 126 over network 106. In some examples, network 106 may be different from area network 148 connecting service 102 to other devices 150. In other examples, area network 148 and network 106 may be the same.

Server 126 may be one or more computing device operated by a service vendor. A service vendor may provide one or more service(s) to a user. In some examples, the service vendor may charge for the one or more service(s). For example, a service vendor may provide printing services to a user and charge the user for each page that is printed. In other examples, the service vendor may provide snacks through a vending machine and charge a user for each item dispensed from the vending machine on behalf of a user request. The service vendor may provide coffee through a coffee machine and charge a user for an amount of coffee dispensed and brewed by the coffee machine on behalf of a user request. The service vendor may provide bikes through a kiosk responsible for managing bikes (e.g., in a bike share program). The service vendor may provide bikes to a customer through the kiosk and charge a user for the bike that is released to the user. Server 126 includes one or more processor(s) 128 (e.g., CPU, GPU, etc.) and storage 130. Storage 130 may store instructions that can be executed by the one or more processor(s) 128. For example, storage 130 stores applications 132, which includes wallet service 134.

Wallet service 134 may represent an application that interfaces with one or more user devices (e.g., user device 104) and one or more services (e.g., service 102). Wallet service 134 may store information about individual user accounts 136(1), . . . , 136(N). For example, user account 136 may be associated with user device 104 and wallet 124. User account 136 may include information such as an amount of credit, and an identifier of a user device 104. The identifier of the user device may include an alphanumeric string of characters that identify the device and additional security tokens associated with the alphanumeric string of characters identifying the device.

For example, the identifier of the user device may include an IMEI number of user device 104 and a one time password (OTP). The OTP may represent an additional layer of security, where the OTP is an automatically generated numeric or alphanumeric string of characters that authenticates the user device 104 for a single transaction or session (e.g., a session with a particular service 102). The OTP may replace authentication login information or may be used in addition to the login information to add another layer of security. As discussed herein, OTP is provided as one example. As such, any type of additional security tokens and protocols may be included with the identifier of the user device stored in wallet service 134.

Further, user account 136 may store settings and preferences specific to a user (e.g., associated with wallet application 124). For example, user account 136 may track services approved for the account, such as in the example where service 102 is a printer, whether printing is approved, the number of pages approved for printing, whether faxing is approved, whether to maintain a log of documents printed, etc. User account 136 may sync an amount of credit in user account 136 with an amount of credit in wallet 124.

Wallet service 134 may also maintain a database of identifiers associated with various printers associated with the service vendor. In one example, server 126 may receive an indication that a user would like to print on a particular printer. Server 126 may access the database to determine the particular printer and communicate information associated with an account of the user to the particular printer and enable the printer to print documents for the user.

In the following example, service 102 is a printer. This example further illustrates how a user may access and print documents on service (e.g., printer) 102 in network architecture 100. In this example, user device 104 is associated with user account 136. A user wishing to print documents on service (e.g., printer) 102 may use user device 104 to scan machine-readable label 116. The user device 104 may use a camera to scan label 116 and process information in the label 116 to extract information such as an identifier of the printer 102. The identifier of the printer 102 may be an alphanumeric identifier that uniquely identifies printer 102. For example, the user device 104 may scan a QR code (e.g., machine-readable label 116) affixed on or near printer 102. In response to extracting the information on label 116, user device 104 may transmit a request 138 (in this example, a print request).

Request 138 (e.g., print request) may include account information associated with the user device 104. For example, the request 138 may include an identifier of user device 104 (e.g., an IMEI number), the identifier of the printer, and an amount of credit in the account (e.g., in wallet 124). The user device 104 may transmit request 138 by way of network 106 to server 126 (i.e., service vendor). A user may also add credit or payment information to user account 136, where the payment information is included in request 138 or alternatively transmitted after the user device 104 transmits the request 138.

Service vendor receives the request 138 at server 126 and in response server 126 communicates with service (e.g., printer) 102 to initiate steps to enable the service (e.g., printer) 102 and user device 104 to connect. For example, application wallet service 134 on server 126 may receive the request 138. Wallet service 134 may identify service (e.g., printer) 102 by way of the identifier of the printer transmitted through request 138. Wallet service 134 may transmit a signal, such as account 140, to service (e.g., printer) 102 by way of network 106.

Account 140 may include at least the following information: the identifier of the user device 104 (e.g., the IMEI number and an OTP), an amount of credit in the account, and services approved for wallet 124 (e.g., in this example where service 102 is a printer, whether printing is allowed, the number of pages of printing, whether faxing is allowed, whether a log should be maintained). In some examples, the amount of credit in the account may be a currency amount, an amount associated with an amount of currency paid for services (e.g., 1 credit may equal $5 in payment), or a number of pages approved for printing. Accordingly, service (e.g., printer) 102 receives account 140 information and in response, service (e.g., printer) 102 may search for the user device 104, based at least in part on the IMEI number.

In this example, after transmitting request 138, user device 104 may enable the communication interface that supports wireless connection 108. For example, the user device 104 may enable Bluetooth®, and maintain a mode that allows user device 104 to be discovered by other devices. Upon finding user device 104 service (e.g., printer) 102 and user device 104 establish wireless connection 108.

In some examples, the wireless connection 108 may be established based upon a handshake protocol. For example, user device 104 may be placed in a listening mode, while service (e.g., printer) 102 transmits an inquiry request. User device 104 may respond with the identifier of the user device 104. Service (e.g., printer) 102 and user device 104 may proceed to form wireless connection 108 after confirming the identifier of the user device 104 matches the identifier of the user device received in the signal, account 140. Service (e.g., printer) 102 may further authenticate user device 104 using the OTP received in account 140 information. Accordingly, user device 104 may access service (e.g., printer) 102 irrespective of user device 104 being configured to be part of an area network 148 that service (e.g., printer) 102 may be connected to.

In this example where service 102 is a printer, the user device 104 may transfer one or more document(s) (e.g., data 142) to service 102, by way of wireless connection 108. In some examples, user device 104 lacks a driver specific to service (e.g., printer) 102. The user device 104 may transmit one or more data (e.g., document(s)) 142 in various formats (e.g., .pdf, Microsoft® standard documents, etc.). Service (e.g., printer) 102 may translate the data (e.g., one or more document(s)) 142 to a format that the printer is capable of printing, for example by using printing algorithm 114. Further, using printing algorithm 114, service (e.g., printer) 102 may determine printing parameters (e.g., orientation, collated, paper size, margins, etc.) associated with the one or more data (e.g., document(s)) 142 to be printed, and print accordingly. For example, service (e.g., printer) 102, by way of printing algorithm 114, may determine to print in portrait mode and double sided and print accordingly. As another example, if service (e.g., printer) 102 is public printer located in a mall, the printer may have one size of paper, accordingly, printing algorithm 114 may resize data (e.g., one or more document(s)) 142 received in size "legal" to size "letter" and print the one or more document(s) (e.g., received as data 142).

During the process of printing one or more document(s) (e.g., as data 142), printer 102 may verify that a sufficient amount of credit is available in an account of the user (e.g., user account 136 associated with wallet 124) before printing the one or more data (e.g., document(s)) 142. Various payment options may be implemented by a service vendor. For example, a user may prepay such that an amount of credit is stored in wallet 124. Alternatively, a user may provide credit card information or bank account information to be charged or debited, respectively. After a service provided by the service vendor is used, the user's credit card or bank account may be charged or debited by the service vendor.

For example in the case where a service 102 is a printer, a user may pay the service vendor for printing services, prior to printing documents on service (e.g., printer) 102. Accordingly an amount of credit in the user account is available in wallet 124, which may also be reflected in user account 136. Server 126 may transmit the amount of credit in the user account 136 (or wallet 124) to service (e.g., printer) 102 in the information transmitted in account 140. In this example where service 102 is a printer, after receiving documents to print over wireless connection 108, service (e.g., printer) 102 may calculate an amount associated with the cost of printing and deduct that amount from the amount of credit transmitted in account 140 to create an updated credit amount. The service (e.g., printer) 102 may transmit the updated credit amount to server 126 as results 144. In the example where the amount of credit is a number of pages allowed to be printed, the service (e.g., printer) 102 may deduct the number of pages printed from the number of pages allowed.

Alternatively, service (e.g., printer) 102 may calculate the amount associated with the cost of printing, and transmit that amount to the server 126 as results 144. After receiving the amount associated with the provided service (e.g., cost of printing), server 126 (e.g., the application wallet service 134) may deduct the amount associated with the cost of the provided service (e.g., printing the documents) from the amount of credit in user account 136.

In this example where service 102 is a printer, service 102 may calculate an amount associated with the cost of printing prior to printing the documents. In one scenario, service 102 may determine that an insufficient amount of credit is in an account for a given requested service. Service 102 may notify the user of the user device 104 that insufficient credit is in the account and provide the user an opportunity to address the insufficient credit.

For example, in the scenario where service 102 is a printer, service 102 may determine an amount associated with the cost of printing is greater than an amount of credit in the account. In response, service 102 may transmit a message to user device 104 indicating that an insufficient amount of credit is in the account. Alternatively, service 102 may transmit a message to server 126 indicating that an insufficient amount of credit is in the account, where in turn the server 126 transmits the message to the user device 104. In response, a user may make an additional payment to increase the amount of credit in the account (e.g., wallet 124), after which service 102 proceeds to print the documents.

In some examples, service 102 may receive an indication that a user wishes to pay by credit card or through a bank account. Service 102 may calculate the amount associated with the cost of a service (either before or after providing the service) and transmit the amount to the server 126 as results 144. After receiving the cost of the service, the server 126 (e.g., through wallet service 134) may charge or debit the respective method of payment (e.g., charge the credit card, debit the bank account, etc.).

In the example where service 102 is a printer, service 102 may calculate the amount associated with the cost of printing and transmit that amount to the server 126 as results 144. After receiving the amount associated with the cost of printing, server 126 (e.g., the application wallet service 134) may charge or debit the respective method of payment (e.g., charge the credit card, debit the bank account, etc). For example, service (e.g., printer) 102 may print ten pages and change ten cents per page. After processing data 142 (e.g., printing one or more document(s)), service 102 may transmit to server 126 (e.g., results 144), that a dollar should be charged or debited.

Following the establishment of the wireless connection 108 between service 102 and user device 104 (e.g., printer 102 authenticates user device 104), service 102 may communicate a status of the service by way of a user interface (UI) or graphical user interface (GUI). Service 102 may have a display screen disposed within the body of the service 102. Examples of a status of a service may include (request received, pending, processing, dispensing, printing, insufficient funds, etc. In the example where service 102 is a printer, service 102 may have a display screen disposed within the body of printer.

Alternatively, by way of wireless connection 108, service 102 may transmit a status of the service to a UI or GUI displayed on the user device 104. Additionally, by way of the UI or GUI, service 102 may allow a user to input preferences (e.g., the snack they would like dispensed, the type of bike they were like to rent, the parameters for brewing coffee, etc.) For example, in the scenario where service 102 is a printer, service 102 may also display messages to user device 102 by way of wireless connection 108. By way of the UI or GUI, service 102 may show a document share status (e.g., in progress, completed, error, etc.), and show document details. Additionally, by way of the UI or GUI, service 102 may allow a user to input preferences such as pages in the document to print. By way of the UI or GUI, service 102 may also show a service status (e.g., printing, completed, insufficient funds, etc.)

After service 102 fulfills a particular request for a service or product, the wireless connection 108 may remain alive for a predetermined amount of time. For example, in the scenario where service 102 is a printer, after the printer prints one or more document(s) (e.g., processes data 142), the wireless connection 108 may remain alive for a predetermined amount of time. Service (e.g., printer) 102 may disconnect the user device 104 and purge data associated with user device 104 and data 142 (e.g., one or more document(s)) that were printed. In some examples, after service 102 disconnects user device 104, in order to reconnect to service 102, user device 104 may transmit a new request 138 (e.g., initiated by rescanning the QR code).

While a printing service is used as an example, the architecture 100 may be used to provide other paid services, where service 102 may provide a service or product that a consumer purchases, and where the service device is capable of connecting by way of a wireless connection 108. For example, service 102 may include a Wi-Fi® or Bluetooth® enabled device such as a vending machine, a coffee machine, a kiosk responsible for managing bikes in a bike share program, etc. The printer and printing service offered is but one example of how such an architecture may be used.

For example, a user may approach a vending machine (e.g., service 102) that is capable of connecting to user device 104. The user may scan a QR code (e.g., machine-readable label 116) displayed near the vending machine (e.g., service 102). In response to scanning the QR code, the user device 104 may transmit a purchase request (e.g., request 138) including an identifier of the device, a form or source of payment, and an identifier of the vending machine (e.g., service 102). The server 126 may transmit information associated with the purchase request (e.g., request 138) to the vending machine (e.g., service 102). The vending machine (e.g., service 102) receives the information (e.g., account 140) and in response a wireless connection 108 is established between the user device 104 and the vending machine (e.g., service 102). The user may use the user device 104 to indicate a product she wants out of the vending machine (e.g., service 102) and transmit the request (e.g., data 142) for the product to the vending machine (e.g., service 102) by way of wireless connection 108. The vending machine (e.g., service 102) may verify that a sufficient amount of credit is available in an account of the user and dispense the product.

Thus, in the network architecture 100, a user device may connect to a printer by scanning a machine-readable label. In response to scanning the machine-readable label, the user device transmits a print request to a service vendor that provides printing services through the printer. The service vendor transmits information to the printer pertaining to the user device requesting access. In response to being contacted by the service vendor, the printer and user device establish a wireless connection, over which documents may be sent to the printer by the user device. The user may transfer payment for printing the documents to the service vendor, which the printer may access prior to printing the documents.

The printer may receive documents, by way of the wireless connection, in formats such as .pdf or word and the printer may translate the documents to a printer friendly language. The printer may determine parameters for printing one or more documents. The user device may print documents without being strongly bound to the printer or being part of an area network connected to the printer to access printing services. Accordingly, the user device may access the printer irrespective of whether the user device is configured to be part of an area network that the printer is connected to and whether the user device has a driver specific to the printer. And a service vendor may also track services that are provided and charge a user accurately for services provided.

Figure 2:
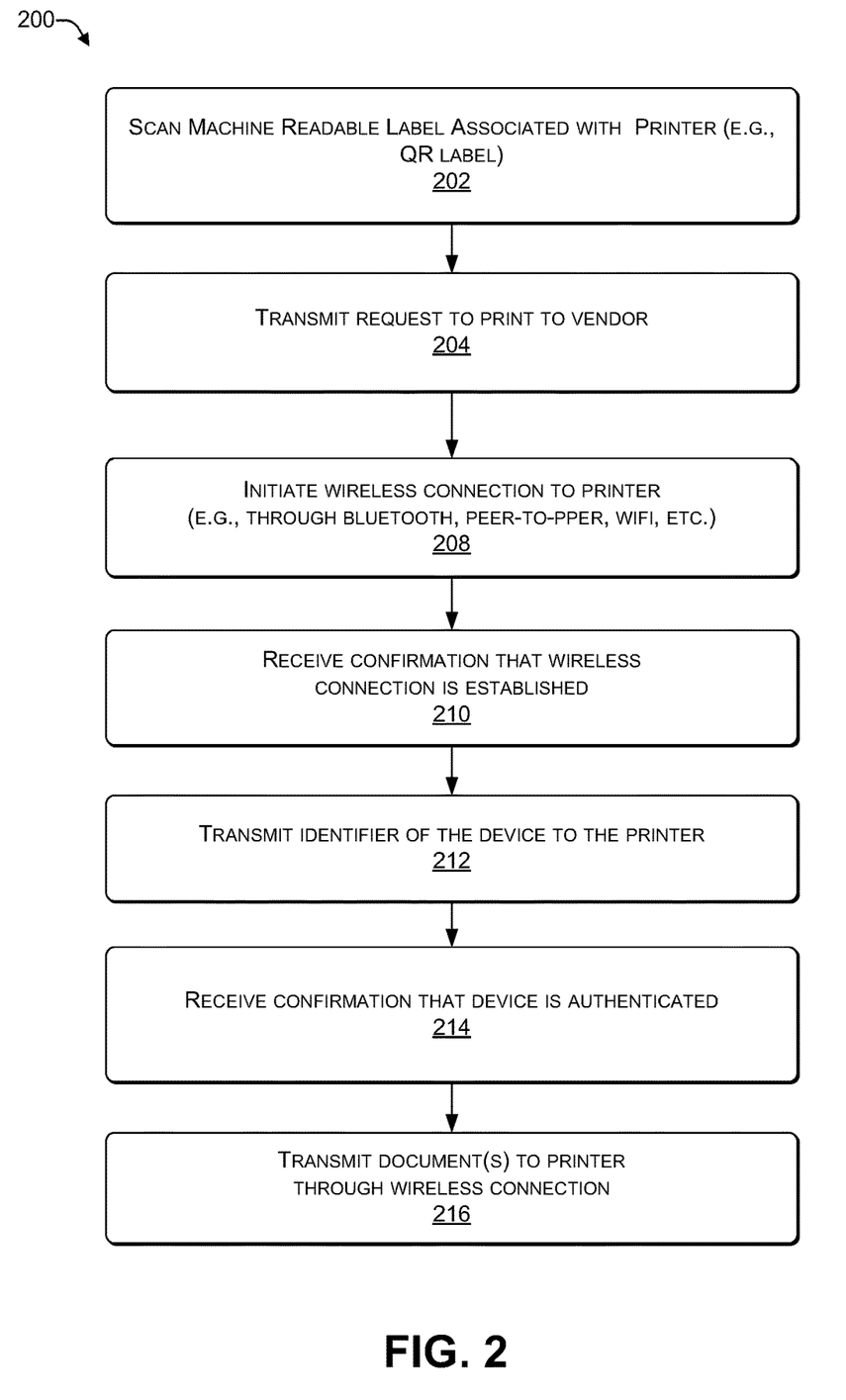
FIG. 2 is a flowchart of a process that includes a user device connecting to a printer and sending documents to be printed according to some embodiments.
Figure 3:
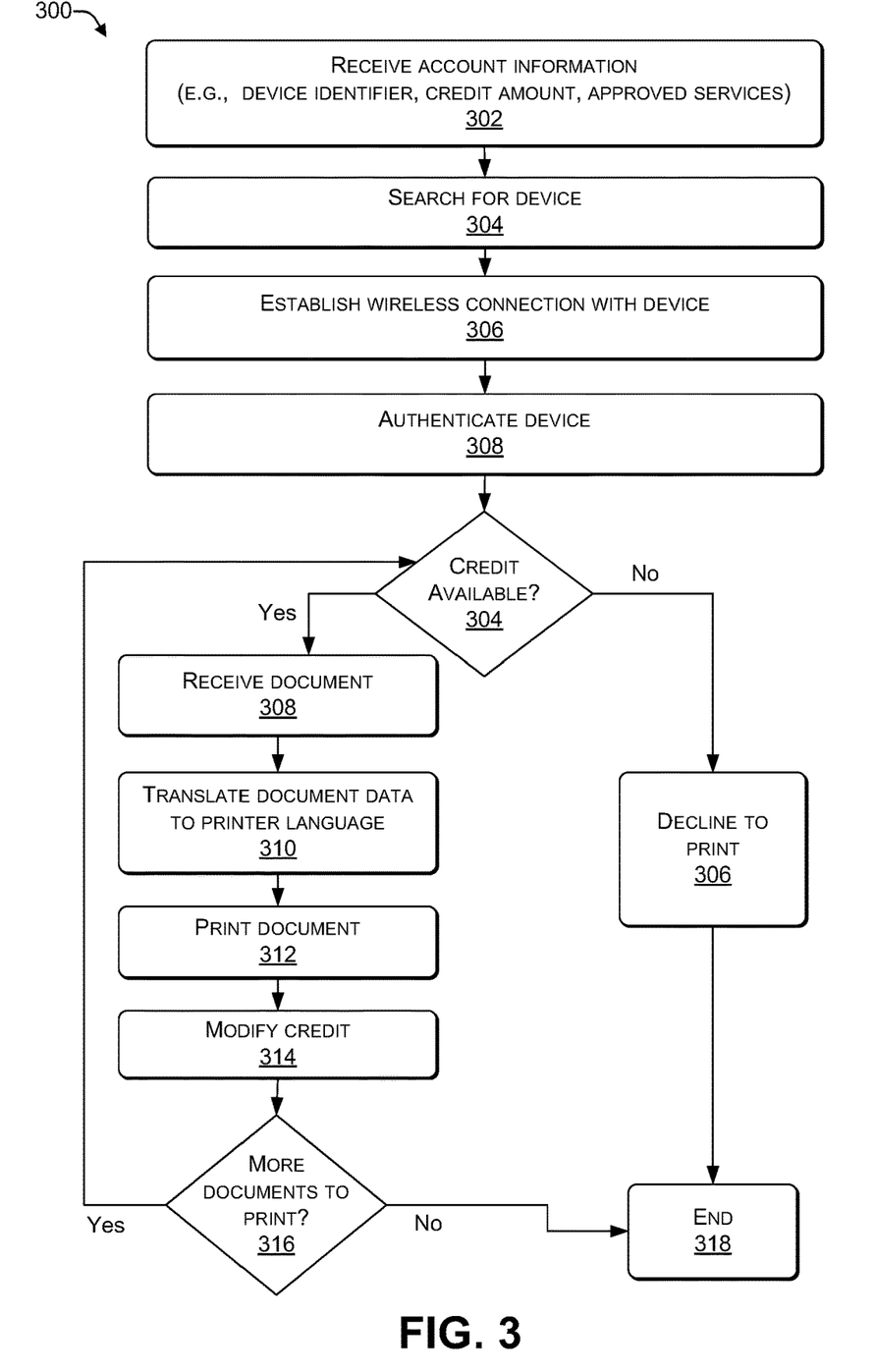
FIG. 3 is a flowchart of a process that includes a printer connecting to a user device and printing documents according to some embodiments.
Figure 4:
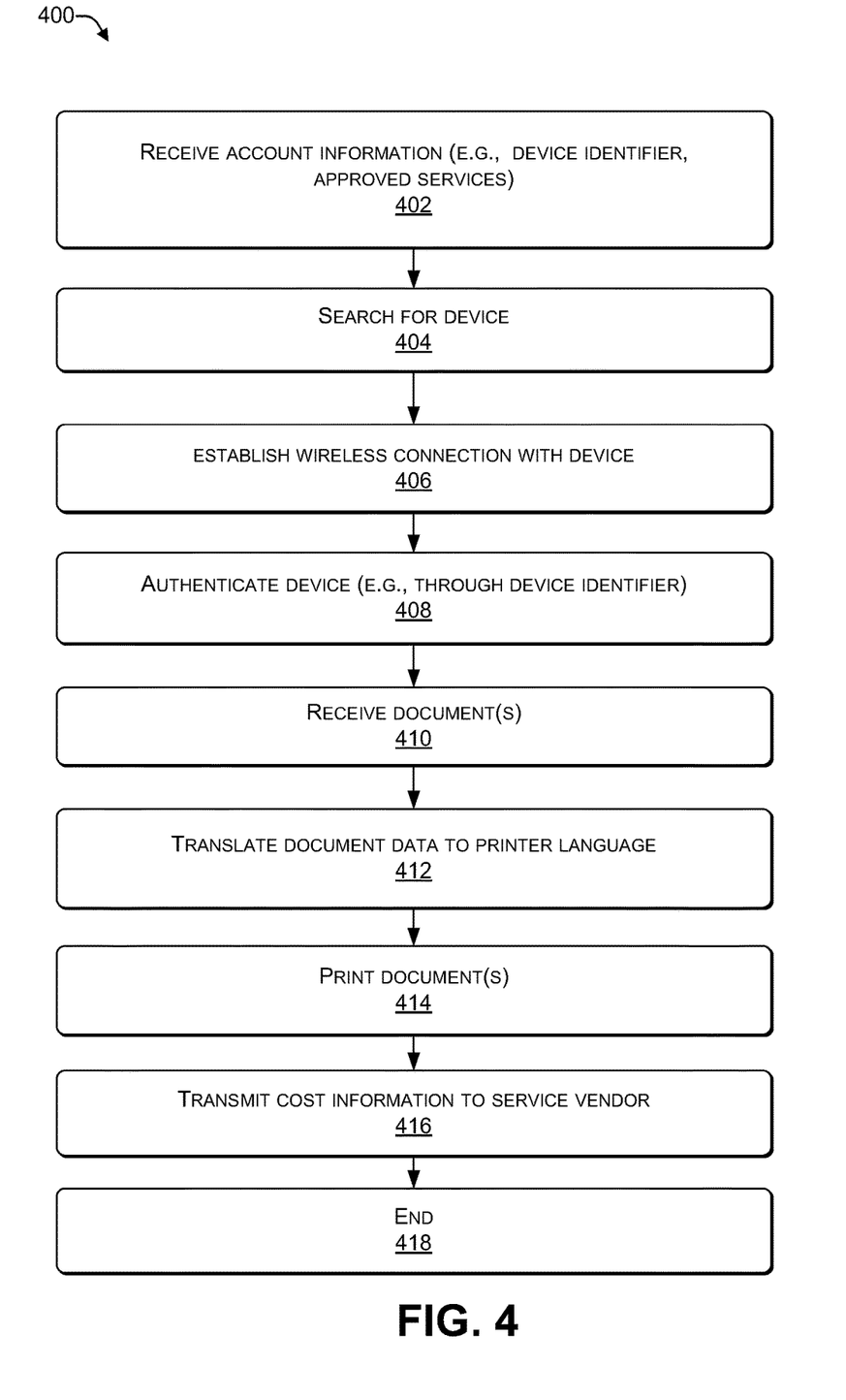
FIG. 4 is a flowchart of a process that includes a printer connecting to a user device and printing documents according to some embodiments.

In the flow diagrams of FIG. 2, FIG. 3, and FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structure, and the like that perform particular functions or implement particular abstract data types. The order in which the blocks are described is not intended to be construed as a limitation, and any number of the described operations can be combined in any order and/or in parallel to implement the processes. For discussion purposes, the processes 200, 300, and 400 are described with references to FIG. 1, as described above, although other models, frameworks, systems and environments may be used to implement this process.

FIG. 2 is a flowchart process 200 that includes scanning a machine-readable label and connecting to a printer. As previously mentioned, any number of paid services may use the architecture 100. A paid print service is used as an example here but it should be understood that other services may be offered. The process 200 may be performed by a processor on user device 104. At 202, a user device scans a machine-readable label associated with a printer. For example, in FIG. 1, user device 104 scans machine-readable label 116. At 204, the user device transmits a request to print to vendor. Continuing the example, user device 104 transmits request 138 to server 126, associated with a service vendor. The request 138 may include an identifier of the user device (e.g., an IMEI number), the identifier of the printer, and an amount of credit in the account (e.g., wallet 124).

At 206, the user device may initiate a wireless connection to the printer, and at 210 the user device receives confirmation that the wireless connection is established. For example, in FIG. 1, the established wireless connection 108 may be a Bluetooth®, peer-to-peer, or Wi-Fi® network. At 212, the user device transmits an identifier of the device to the printer and at 214 the user device receives confirmation that the device is authenticated. For example, in FIG. 1, the user device 104 may transmit an IMEI number. Further the user device may use an OTP during the authentication process, based on which the service 102 may authenticate user device 104. At 216, the user device transmits document(s) to the printer through the wireless connection. For example, in FIG. 1, the user device 104 transmits data 142.

Thus, a user device may connect to a printer by scanning a machine-readable label. In response to scanning the machine-readable label, the user device transmits a print request to a service vendor that provides printing services through the printer. The service vendor transmits information to the printer pertaining to the user device requesting access. In response to being contacted by the service vendor, the printer and user device establish a wireless connection, over which documents may be sent to the printer by the user device. The user may transfer payment for printing the documents to the service vendor, which the printer may access prior to printing the documents.

The printer may receive documents, by way of the wireless connection, in formats such as .pdf or word and the printer may translate the documents to a printer friendly language. The printer may determine parameters for printing one or more documents. The user device may print documents without being strongly bound to the printer or being part of an area network connected to the printer to access printing services. Accordingly, the user device may access the printer irrespective of whether the user device is configured to be part of an area network that the printer is connected to and whether the user device has a driver specific to the printer. And a service vendor may also track services that are provided and charge a user accurately for services provided.

FIG. 3 is a flowchart of a process 300 that includes a printer receiving documents and charging for printing services. As previously mentioned, any number of paid services may use the architecture 100. A paid print service is used as an example here but it should be understood that other services may be offered. The process 300 may be performed by a processor 110 of service 102. At 302, a printer receives account information. For example, this account information may be account 140 in FIG. 1. Account 140 may include information such as an identifier of a device, an amount of credit in the account, and services approved for the account. The identifier of the device may include an IMEI number and an OTP. An amount of credit in the account may include currency or an amount associated with an amount paid for services. Services approved for the account may include whether printing is allowed, the number of pages of printing, whether faxing is allowed, and whether a log should be maintained.

At block 304, the printer searches for the device. For example, in FIG. 1, service 102 searches for user device 104 (e.g., based on the identifier of the device). At 306, the printer establishes a wireless connection with the device, and at 308, the printer authenticates the device. For example, in FIG. 1, service 102 and user device 104 establish wireless connection 108. In some examples, the service 102 may use an OTP to further authenticate the user device 104.

At decision block 304, the printer decides whether sufficient credit is available. For example, in FIG. 1, service 102 may check the amount of credit in the account, based on the information transmitted in account 140. The amount of credit may be an amount of currency paid for the services, or a number of pages approved for printing. If no credit is available in the account, the flow proceeds to block 306 where the printer declines to print and the flow ends at 318. In some examples, at block 306, the printer may send a notification to a user device that there are insufficient funds in the account. In response the user may add credit to her account after which the printer may initiate printing.

Returning back to decision block 304, if the printer determines credit is available at block 304, the flow proceeds to block 308. At block 308, the printer receives a document. For example, in FIG. 1 the service 102, receives data 142 by way of wireless connection 108.

At block 310, the printer translates the document data to a printer language, and at block 312 the printer prints the document. As discussed in FIG. 1 and in the example where service 102 is a printer, the printer may select the parameters for printing the document. For example, the printer may determine an orientation to print, the size to print, whether to print double-sided, etc. At block 314, the printer modifies credit. For example, if the service (e.g., printer) 102 received an approved number of pages to print, such as ten from the information transmitted in account 140, after printing one page, the service (e.g., printer) 102 may modify the credit from ten to nine. In another example, if the printer 102 received an amount of credit of five dollars in the information transmitted in account 140, after printing a page (at ten cents per page), the service (e.g., printer) 102 may modify the amount of credit from five dollars to $4.90.

At decision block 316, the printer determines if there are additional documents to print. If there are no additional documents to print, the flow ends at 318. If there are additional documents to print, flow proceeds back to decision block 304 where the printer checks an amount of credit available. In some examples, the printer may transmit the result of printing back to the service vendor, including the updated credit amount (e.g., reflecting how much credit was used up). For example, in FIG. 1, service 102 transmits results 144 to server 126.

Thus, a user device may connect to a printer by scanning a machine-readable label. In response to scanning the machine-readable label, the user device transmits a print request to a service vendor that provides printing services through the printer. The service vendor transmits information to the printer pertaining to the user device requesting access. In response to being contacted by the service vendor, the printer and user device establish a wireless connection, over which documents may be sent to the printer by the user device. The user may transfer payment for printing the documents to the service vendor, which the printer may access prior to printing the documents.

The printer may receive documents, by way of the wireless connection, in formats such as .pdf or word and the printer may translate the documents to a printer friendly language. The printer may determine parameters for printing one or more documents. The user device may print documents without being strongly bound to the printer or being part of an area network connected to the printer to access printing services. Accordingly, the user device may access the printer irrespective of whether the user device is configured to be part of an area network that the printer is connected to and whether the user device has a driver specific to the printer. And a service vendor may also track services that are provided and charge a user accurately for services provided.

FIG. 4 is a flowchart of a process 400 that includes a printer receiving documents and charging or debiting a credit card or bank account after printing documents. As previously mentioned, any number of paid services may use the architecture 100. A paid print service is used as an example here but it should be understood that other services may be offered. The process 400 may be performed by a processor 110 of service 102. At 402, a printer receives account information. For example, this account information may be account 140 in FIG. 1. Account 140 may include information such as an identifier of a device, an amount of credit in the account, and services approved for the account. The identifier of the device may include an IMEI number and an OTP. An amount of credit in the account may include an indication that a user wishes to charge a credit card or debit a bank account for services provided by the vendor service. Services approved for the account may include whether printing is allowed, the number of pages of printing, whether faxing is allowed, and whether a log should be maintained.

At block 404, the printer searches for the device. For example, in FIG. 1, service 102 searches for user device 104 (e.g., based on the identifier of the device). At 406, the printer establishes a wireless connection with the device, and at 408, the printer authenticates the device. For example, in FIG. 1, service 102 and user device 104 establish wireless connection 108. In some examples, the service 102 may use an OTP to further authenticate the user device 104.

At 410, the printer receives one or more document(s). For example, in FIG. 1, the service 102 receives data 142 (e.g., one or more document(s)) by way of wireless connection 108. At block 412, the printer translates the document data to a printer language, and at block 414 the printer prints the document. As discussed in FIG. 1 and in an example where service 102 is a printer, the printer may select the parameters for printing the document. For example, the printer may determine an orientation to print, the size to print, whether to print double-sided, etc.

At block 416, the printer transmits cost information to the service vendor. For example, the printer may transmit a number of pages that were printed or an amount to charge the credit card or debit a bank account. In FIG. 1, service 102 transmits results 144 that may include this information to server 126. The flow ends at 418.

Thus, a user device may connect to a printer by scanning a machine-readable label. In response to scanning the machine-readable label, the user device transmits a print request to a service vendor that provides printing services through the printer. The service vendor transmits information to the printer pertaining to the user device requesting access. In response to being contacted by the service vendor, the printer and user device establish a wireless connection, over which documents may be sent to the printer by the user device. The user may transfer payment for printing the documents to the service vendor, which the printer may access prior to printing the documents.

The printer may receive documents, by way of the wireless connection, in formats such as .pdf or word and the printer may translate the documents to a printer friendly language. The printer may determine parameters for printing one or more documents. The user device may print documents without being strongly bound to the printer or being part of an area network connected to the printer to access printing services. Accordingly, the user device may access the printer irrespective of whether the user device is configured to be part of an area network that the printer is connected to and whether the user device has a driver specific to the printer. And a service vendor may also track services that are provided and charge a user accurately for services provided.

Figure 5:
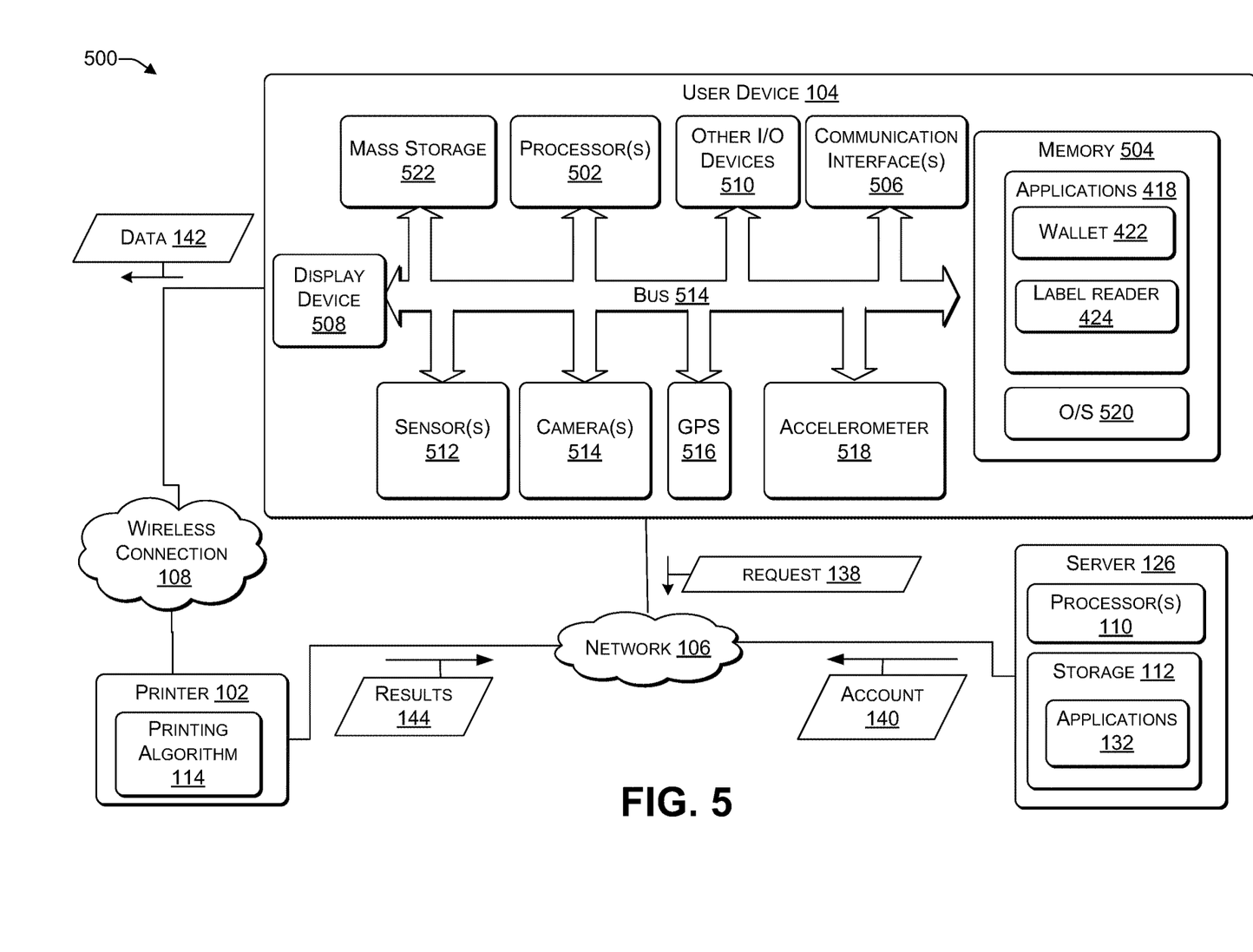
FIG. 5 illustrates an example configuration of a computing device that can be used to implement the systems and techniques described herein and according to some embodiments.

FIG. 5 illustrates an example configuration of a computing device 500 that can be used to implement the systems and techniques described herein, such as for example, the system 100 of FIG. 1, the user device 104. The computing device 500 may include one or more processors 502 (e.g., CPU, GPU, or the like), a memory 504, communication interfaces 506, a display device 508, one or more mass storage devices 522, other input/output (I/O) devices 510 (e.g., keyboard, trackball, and the like), one or more sensor(s) 512, one or more camera(s) 514, a Global Positioning System (GPS) 516, and accelerometer 518, configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage device 522, or other computer-readable media.

Memory 504 and mass storage device 522 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 522 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 522 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The computing device 500 may include one or more communication interfaces 506 for exchanging data via networks 106 or wireless connection 108. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 508 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth.

The sensor(s) 512 may include touch, proximity, light, heart rate, and pressure sensors. Camera(s) 514 may include complimentary metal-oxide-semiconductor (CMOS) image sensors, backside illuminated CMOS, or similar types of image sensors to capture images. GPS 516 may include a receiver that may receive geolocation and time information anywhere on Earth that has access to four or more GPS satellites. The GPS 516 may not transmit data and may operate independently of any telephonic or internet reception. Accelerometer 518 includes a device that measures the acceleration of the user device 104 in its own instantaneous rest frame. Accelerometer 518 may play a part in a navigation system of the user device 104.

The computer storage media, such as memory 504 and mass storage devices 522, may be used to store software and data. For example, the computer storage media may be used to store applications like wallet 124 and label reader 424. Label reader 424 may receive an image of a machine-readable code captured by one or more camera(s) 514 and decipher the code. Furthermore, memory 504 may store an operating system (O/S) 520 of the user device 104. O/S 520 manages computer hardware and software resources in user device 104.

The computing device 500 may be communicatively coupled via the network 106 to a server 126 and communicatively coupled via wireless connection 108 to printer 102. Additionally, printer 102 may be communicatively coupled via network 106 to server 126. The user device 104 may scan a machine-readable label associated with printer 102 using the one or more camera(s) 514. In response to scanning the label, the user device 104 may transmit request 138 to server 126 by way of network 106. In response to receiving request 138, server 126 may transmit information account 140 to printer 102.

In response to receiving account 140, printer 102 and user device 104 may establish wireless connection 108. User device 104 may transfer one or more document(s) (e.g., data 142) to printer 102 by way of wireless connection 108. The printer 102 receives one or more document(s) (received as data 142) and prints the documents. Printer 102 may transmit results 144 to server 126 after completing the printing job.

Thus, a user device may connect to a printer by scanning a machine-readable label. In response to scanning the machine-readable label, the user device transmits a print request to a service vendor that provides printing services through the printer. The service vendor transmits information to the printer pertaining to the user device requesting access. In response to being contacted by the service vendor, the printer and user device establish a wireless connection, over which documents may be sent to the printer by the user device. The user may transfer payment for printing the documents to the service vendor, which the printer may access prior to printing the documents.

The printer may receive documents, by way of the wireless connection, in formats such as .pdf or word and the printer may translate the documents to a printer friendly language. The printer may determine parameters for printing one or more documents. The user device may print documents without being strongly bound to the printer or being part of an area network connected to the printer to access printing services. Accordingly, the user device may access the printer irrespective of whether the user device is configured to be part of an area network that the printer is connected to and whether the user device has a driver specific to the printer. And a service vendor may also track services that are provided and charge a user accurately for services provided.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A service device comprising:
one or more processors; and
one or more non-transitory computer-readable media storing instructions executable by the one or more processors to perform operations comprising:
receiving from a server, account information associated with a user device, the account information comprising a device identifier and an amount of credit in an account associated with the user device, wherein the device identifier comprises an International Mobile Equipment Identifier (IMEI) that uniquely identifies the user device;

receiving, from the server, a one-time password to access the account associated with the user device to establish a single session;

in response to receiving the account information, initiating a process to identify the user device using a wireless communication protocol based at least in part on the device identifier;

in response to identifying the user device based at least in part on the device identifier, establishing the single session using wireless communications between the service device and the user device;

authenticating the user device based at least in part on the one-time password;

sending, to the user device, a confirmation message indicating that the single session is established;

receiving, via the wireless communications, digital data from the user device;

receiving, via the wireless communications, at least one action to be performed during the single session;

determining that the at least one action is permitted based on a set of approved actions associated with the account;

performing the at least one action using the digital data;

sending, to the user device, a status associated with performing the at least one action; and modifying, based at least in part on the at least one action and the digital data, the amount of credit in the account to create an updated credit amount.

2. The service device of claim 1, wherein:
the service device comprises a printer; and
performing the at least one action based at least in part on the digital data comprises:
  determining that the digital data comprises a document and printing parameters;
  determining that the at least one action comprises printing the document;
  translating the document to a document format that the printer is capable of printing;
  configuring the printer to print the document using the printing parameters; and
  printing the document in the document format.

3. The service device of claim 2, wherein modifying the amount of credit in the account comprises:
  determining a number of pages of the document that were printed by the printer;
  determining, based on the number of pages of the document that were printed, a debit amount by which to reduce the amount of credit;
  reducing the amount of credit in the account based on the debit amount, to create the updated credit amount; and
  transmitting the updated credit amount to the server.

4. The service device of claim 2, the operations further comprising:
  receiving an additional document for printing;
  translating the additional document to a second format that the printer is capable of printing;
  printing the additional document using the printer; and
  modifying the updated credit amount.

5. The service device of claim 1, the operations further comprising:
  displaying a machine-readable label associated with the service device,
  wherein the user device sends a request to the server after the user device scans the machine-readable label, the request comprising the device identifier.

6. The service device of claim 1, wherein the device identifier further comprises a media access control (MAC) address.

7. The service device of claim 1, wherein:
the service device comprises a router, and
the at least one action comprises enabling the user device to access a wireless network that is connected to the router.

8. A method comprising:
receiving from a server, by one or more processors of a service device, account information associated with a user device, the account information comprising a device identifier and an amount of credit in an account associated with the user device, wherein the device identifier comprises an International Mobile Equipment Identifier (IMEI) that uniquely identifies the user device;

receiving, from the server, a one-time password to access the account associated with the user device to establish a single session;

in response to receiving the account information, initiating a process to identify the user device using a wireless communication protocol based at least in part on the device identifier;

in response to identifying the user device based at least in part on the device identifier, establishing the single session using wireless communications between the service device and the user device;

authenticating the user device based at least in part on the one-time password;

sending, to the user device, a confirmation message indicating that the single session is established;

receiving, by the one or more processors, digital data from the user device via the wireless communications;

receiving, by the one or more processors via the wireless communications, at least one action to be performed during the single session;

determining that the at least one action is permitted based on a set of approved actions associated with the account;

performing the at least one action, by the one or more processors, using the digital data;

sending, by the one or more processors and to the user device, a status associated with performing the at least one action; and modifying, by the one or more processors and based at least in part on the at least one action and the digital data, the amount of credit in the account to create an updated credit amount.

9. The method of claim 8, wherein:
the service device comprises a printer; and
performing the at least one action based at least in part on the digital data comprises:
  determining that the digital data comprises a document and printing parameters;
  determining that the at least one action comprises printing the document;
  translating the document to a format that the printer is capable of printing;
  configuring the printer to print the document using the printing parameters; and
  printing the document using the printer.

10. The method of claim 9, wherein modifying the amount of credit in an account comprises:
  determining a number of pages of the document that were printed by the printer;

determining, based on the number of pages of the document that were printed, a debit amount by which to reduce the amount of credit;

reducing the amount of credit in the account based on the debit amount, to create the updated credit amount; and transmitting to the server a result of printing the document, the result comprising the number of pages that were printed and the updated credit amount.

11. The method of claim 8, further comprising:

displaying a machine-readable label associated with the action, wherein the user device sends a request to the server after the user device scans the machine-readable label, the request comprising the device identifier.

12. The method of claim 8, wherein:

the service device comprises a router connected to a wireless network; and the at least one action comprises enabling the user device to access the wireless network using the service device that is connected to the wireless network.

13. One or more non-transitory computer-readable storage media to store instructions that are executable by one or more processors of a service device to perform operations comprising:

receiving from a server, by the service device, account information associated with a user device, the account information comprising a device identifier and an amount of credit in an account associated with the user device, wherein the device identifier comprises an International Mobile Equipment Identifier (IMEI) that uniquely identifies the user device;

receiving, from the server, a one-time password to access the account associated with the user device to perform at least one action during a single session;

in response to receiving the account information, initiating a process to identify the user device using a wireless communication protocol and based at least in part on the device identifier;

in response to identifying the user device based at least in part on the device identifier, establishing the single session using wireless communications between the service device and the user device;

authenticating the user device based at least in part on the one-time password;

sending, to the user device, a confirmation message indicating that the single session is established;

receiving, via the wireless communications, digital data from the user device;

receiving, via the wireless communications, at least one action to be performed during the single session;

determining that the at least one action is permitted based on a set of approved actions associated with the account;

performing the at least one action, by the service device, using the digital data; and modifying, by the service device and based at least in part on the at least one action and the digital data, the amount of credit in the account to create an updated credit amount.

14. The one or more non-transitory computer-readable storage media of claim 13, wherein:

the service device comprises a printer; and performing the at least one action based at least in part on the digital data comprises:

determining that the digital data comprises a document and printing parameters;

determining that the at least one action comprises printing the document;

translating the document to a format that the printer is capable of printing;

configuring the printer to print the document using the printing parameters; and printing the document.

15. The one or more non-transitory computer-readable storage media of claim 14, wherein modifying the amount of credit in an account comprises:

determining a number of pages of the document that were printed by the printer;

determining, based on the number of pages of the document that were printed, a debit amount by which to reduce the amount of credit;

reducing the amount of credit in the account based on the debit amount, to create the updated credit amount; and transmitting to the server a result of printing the document, the result comprising the number of pages that were printed and the updated credit amount.

16. The one or more non-transitory computer-readable storage media of claim 13, the operations further comprising:

displaying a machine-readable label associated with the action, wherein the user device sends a request to the server after the user device has scanned the machine-readable label, the request comprising the device identifier associated with the user device.

17. The one or more non-transitory computer-readable storage media of claim 13, wherein:

the service device comprises a router; and the at least one action comprises enabling the user device to access a wireless network using the service device.

* * * * *